United States Patent
Cortes Gomez

(10) Patent No.: US 8,437,774 B2
(45) Date of Patent: May 7, 2013

(54) METHOD AND USER EQUIPMENT FOR MOBILE DEVICE REGISTRATION

(75) Inventor: Francisco Cortes Gomez, Würselen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 133 days.

(21) Appl. No.: 12/866,052

(22) PCT Filed: Feb. 8, 2008

(86) PCT No.: PCT/EP2008/051576
§ 371 (c)(1),
(2), (4) Date: Aug. 4, 2010

(87) PCT Pub. No.: WO2009/097901
PCT Pub. Date: Aug. 13, 2009

(65) Prior Publication Data
US 2010/0323692 A1  Dec. 23, 2010

(51) Int. Cl.
*H04W 24/00* (2009.01)

(52) U.S. Cl.
USPC ............... 455/456.1; 455/433; 455/435.1; 455/432.3

(58) Field of Classification Search ............... 455/432.3, 455/433, 435.1, 435.2, 435.3, 443, 444, 445, 455/414.1, 403, 550.1
See application file for complete search history.

(56) References Cited

U.S. PATENT DOCUMENTS

| | | | | |
|---|---|---|---|---|
| 5,898,923 A | * | 4/1999 | Gaasvik et al. | 455/434 |
| 6,992,993 B1 | * | 1/2006 | Park et al. | 370/328 |
| 7,072,654 B2 | * | 7/2006 | Fujiwara et al. | 455/435.1 |
| 7,142,879 B2 | * | 11/2006 | Watanabe et al. | 455/458 |
| 7,937,084 B2 | * | 5/2011 | Okubo et al. | 455/433 |
| 7,941,142 B2 | * | 5/2011 | Aikawa et al. | 455/435.1 |
| 2007/0115951 A1 | * | 5/2007 | Karaoguz et al. | 370/356 |
| 2008/0096556 A1 | * | 4/2008 | Shinozaki | 455/435.1 |
| 2010/0113017 A1 | * | 5/2010 | Bleckert et al. | 455/433 |

OTHER PUBLICATIONS

Ericsson: "Random Waiting Time at LA/RA Update" [Online] No. S2-074125, Oct. 7, 2007-Oct. 11, 2008 XP002500752 Kobe, Japan Retrieved from the Internet: URL:http://www.3gpp.org/ftp/TSG_SA/WG2-Arch/TSG2_60_60 Kobe/Docs/> p. 1, line 10-line 12 p. 1, line 28-line 36.

NTT Docomo, Inc: "A way forward for registration in densely-populated area" [Online] No. S2-073525, Aug. 27, 2007-Aug. 31, 2007 XP002500753 Helsinki, Finland Retrieved from the Internet: URL:http://www.3gpp.org/ftp/TSG_SA/WG2_Arch/TSGS2_59_Helsinki/Docs/> p. 2, line 27-line 28 p. 1, line 32-line 34 p. 2, line 3-line 9; fi~ure 1 p. 3; figure 2.

* cited by examiner

Primary Examiner — Jean Gelin

(57) ABSTRACT

A method and apparatus for a registration update of a mobile device (UE) in a communication network is described. The location of the mobile device (UE) is registered in a first registration area (A) and associated with a list of further registration areas (B). A registration area update is triggered when the mobile device (UE) is detecting a change of location to a second registration area. The registration area update is initiated with a random time delay after the mobile device (UE) detects the change to the second registration area if the second registration area is in the list of further registration areas (B).

9 Claims, 4 Drawing Sheets

(a)

(b)

METHOD AND USER EQUIPMENT FOR MOBILE DEVICE REGISTRATION

TECHNICAL FIELD

The present invention generally relates to a registration update of a mobile device in a communication network. A device embodying the invention is also described.

BACKGROUND

In today's mobile wireless networks like the Global System for Mobile communications (GSM), the area in which transfer of radio signals between a mobile device and a selected base station is possible, can change when the device moves. A base station is a wireless communications station for providing access of mobile devices to the mobile wireless network. The area covered by a base station, or a subunit of it, is frequently referred to as a cell. In order for incoming calls to be received, the mobile device is located. This means that the system determines where the device currently is. When the mobile device is idle, i.e. switched on and not active in a call, its mobility is tracked by the system using the concept of registration areas. Often, e.g. in GSM, the location is tracked by the core network of the system. An example of the concept of registration areas are the location areas in GSM. A location area is a set of one or more cells which are grouped together to optimize signaling to and from mobile devices.

Because of geographical mobility, or due to changes in the coverage of the registration areas, mobile devices in idle mode update their registration towards the core network when they cross the border between registration areas. This process is generally referred to as registration area update or registration update procedure and it can cause excess registration traffic. Good examples are the bursts of registration traffic around the border of location areas when trains full with commuters traverse those borders. This is a serious problem e.g. in heavy populated areas or cities when big numbers of people move together due to commuting or a concert or a sports event. Users around the borders of location areas are potentially unable to have access to communication services for a certain time period due to congestion caused by a burst of registration update procedures.

Solutions for the problems occurring due to a burst of registration update procedures have been the subject of investigation from the 3$^{rd}$ Generation Partnership Project (3GPP) in the 3GPP Technical Report 23.880 V0.1.0 (2007-10), "Stage2 for Registration in Densely-populated area (RED); Solution Placeholder". Different alternatives are proposed as solutions. A short summary of such solutions is mentioned below.

Mobile devices which execute a registration update receive a list of location areas. As long as the devices move within a location area in this list, they don't have to execute a new registration update. By providing different lists to different sets of mobile devices, it can be achieved that only devices from some sets generate registration signaling at a specific location area border. As an alternative, the concept of extra areas is introduced, which are defined to be smaller than location areas. Due to their smaller size reduction in the amount of paging signaling during registration area updates can be achieved. In both cases the amount of signaling between the mobile devices and the core network at location area borders can only be divided by a constant factor, still allowing significant peaks in registration signaling to remain. Also the bursts of registration traffic around the border of location areas in the case of trains full of commuters are not reduced.

Alternatively a random wait time for registration area updates can be used, thus aiming to spread the updates over a period of time when the mobile devices move to a new registration area. In this case, during the random wait time, the mobile devices are not reachable. It is difficult to find a right value for the wait time since if it is long there is a high probability of call failures. If the wait time is short the advantage of spreading the signaling load is lost.

All alternatives increase complexity and implementation costs. Due to these reasons they not attractive as general case solutions to solve the problems occurring by the burst of registration update procedures, making them only appropriate for specific areas where frequent signaling bursts justify the increased complexity and implementation costs.

SUMMARY

It is an object of the present invention to obviate the above disadvantages and provide an advantageous method for a registration update of a mobile device.

According to the invention, the method described in claim 1 is performed. Furthermore, the invention is embodied in a device and a program as described in the further independent claims. Embodiments of the invention are described in the dependent claims.

A method for a registration update of a mobile device in a communication network is proposed. The location of the mobile device is registered in a first registration area and associated with a list of further registration areas. A registration area update is triggered when the mobile device is detecting a change of location to a second registration area. The registration area update is initiated with a random time delay after the mobile device detects the change to the second registration area if the second registration area is in the list of further registration areas.

A user equipment for a mobile communication network comprises a receiver unit. The receiver unit can receive indications of registration areas and a list of registration areas. A memory is adapted to store the list of registration areas. Furthermore, a detector is adapted to detect a change of location based on an indication of a second registration area. A control device of the user equipment is adapted to trigger a registration area update. It is adapted to initiate the execution of the registration area update with a random time delay after the change of location is detected if the second registration area is in the stored list of registration areas.

The method can also be embodied in a program which is for example stored on a data carrier or loadable into a processing system of a mobile device, e.g. as a sequence of signals.

The proposed method and devices allow an advantageous registration update of a mobile device which can spread the signaling load in a mobile network while avoiding that a mobile device is not reachable for a period of time.

The foregoing and other objects, features and advantages of the present invention will become more apparent in the following detailed description of preferred embodiments as illustrated in the accompanying drawings.

DETAILED DESCRIPTION

Figure 1:
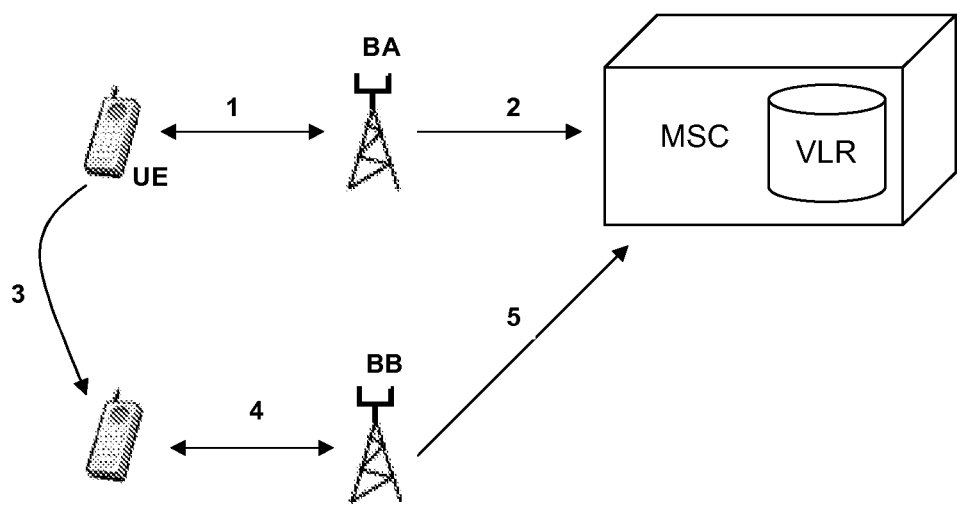
FIG. 1 shows basic elements of a mobile wireless network

FIG. 1 shows the example of a mobile device UE in a customary GSM network. The mobile device should regularly report its location to the mobile network, using a periodic registration area update. This update simplifies paging which is the process when the mobile network locates the mobile device in order to offer services to it, e.g. a mobile terminating call. FIG. 1 shows a mobile device in idle mode. The mobile device informs the core network of its presence by sending information, via wireless link 1, to a base station BA and this information is forwarded, via link 2, from base station BA to a Mobile Switching Center (MSC) and stored in a Visitor Location Register (VLR). The VLR is a temporary database registering mobile devices in the particular area which it serves. In practice, the VLR is usually attached to a MSC and therefore it is referred to as MSC/VLR. The MSC is a telephone exchange providing telephony services to mobile devices which are within an area that the MSC/VLR serves. The same procedure happens if the mobile device moves to a new location as indicated by arrow 3. The mobile device informs the core network of its presence by sending, via link 4, information to a base station BB and this information is forwarded, via link 5, from base station BB to the MSC/VLR and stored in the VLR.

It becomes apparent that the registration update procedure can involve considerable signaling load which can potentially lead to problems as mentioned in the background section. The basic concept for solving these problems is based on the way registration area updates are handled. The location of the mobile device, i.e. the present registration area (RA), is associated with a list of registrations areas which may comprise one or more registration areas. A mobile device which detects a change of its location when it moves from the registration area where it executed its last registration update into a new registration area, which is still in the list, waits for a random amount of time before initiating a new registration update.

Whenever the mobile device moves to a new RA there are two different processes which may happen depending on this new RA. If the new RA is not in the last received list, a registration update is immediately performed as usual. If all neighbor RAs are included in the list, this does not happen often.

The term "registration area" as it is used in this text is a generic name for a registration area and it could be any type of a location area for GSM, a registration area for General Packet Radio Service (GPRS) or an extra area for GSM or GPRS or a registration area in the Universal Mobile Telecommunications System (UMTS). The term registration update procedure is performed in such systems between the mobile device and the core network or evolved Packet Core using the current system architecture evolution terminology.

In other terms, a method for a registration update of a mobile device in a communication network is proposed. The location of the mobile device is registered in a first registration area, i.e. the mobile device has performed a prior registration update procedure with the communication network. The present location of the mobile device, e.g. the registration area in which it is presently registered is associated with a list of further registration areas. A registration area update is triggered when the mobile device is detecting a change of location to a second registration area. For example, an identification of the respective registration area can be broadcasted in all cells so that the mobile device can compare the presently received identification to the last identification received. The registration area update is initiated with a random time delay after the mobile device detects the change to the second registration area if the second registration area is in the list of further registration areas.

The list of further registration areas is updated for example in the registration area update. The list of further registration areas can alternatively or additionally be received in a periodic registration area update or in another non-access stratum procedure. For example, at a GSM periodic location area update, the mobile device can receive the list of registration areas where it does not need to perform a new registration update immediately.

In an embodiment, the list of further registration areas comprises at least one third registration area in addition to the further registration areas. The mobile device does not perform a registration area update if it detects the change of location to the third registration area. In this way, it is for example possible to define central registration areas adjacent to the present registration area of the mobile device in which no registration area update needs to be performed while the mobile device performs a registration area update with a random delay when moving to the registration areas in the list outside the central region.

The first registration area can be in the list of further registration areas. This allows for example that the same list can be used in a plurality of, preferably adjacent, registration areas.

In an embodiment, the list of further registration areas is centered at the first registration area. However, it is not necessary that all adjacent registration areas are in the list, e.g. if the list comprises only cells along a railway line or if the registration area is at the edge of the service area of a core network node, e.g. an MSC, or at an edge of a national network, i.e. on a country border. It is also possible that the registration area is not completely surrounded by other registration areas, e.g. in coastal areas.

Preferably, the registration area update is initiated immediately when the mobile device detects the change of a location to a second registration area which is not in the list of further registration areas. In particular, the term immediately means that the registration area update procedure is started without random time delay.

The random time delay is for example selected from a range which has a maximum value dependent on the time between prior executions of the registration area updates. In this way, the size of the registration areas and the speed of the mobile device can be considered. An alternative option is to use a fixed maximum value of the random time delay or a maximum value which is specific for the present registration area and can thus for example consider different registration area sizes in rural and metropolitan areas.

In an embodiment the random time delay is within a range which has a minimum value larger than zero. Legacy mobile devices which do not implement the proposed method may cause a peak in registration update signaling when a group of mobile terminals crosses a border between registration areas. Defining a minimum value for the random time delay avoids that mobile devices adapted to the method perform a registration area update during this peak. Preferably, the minimum value is larger than the duration of the signaling peak.

Figure 2:
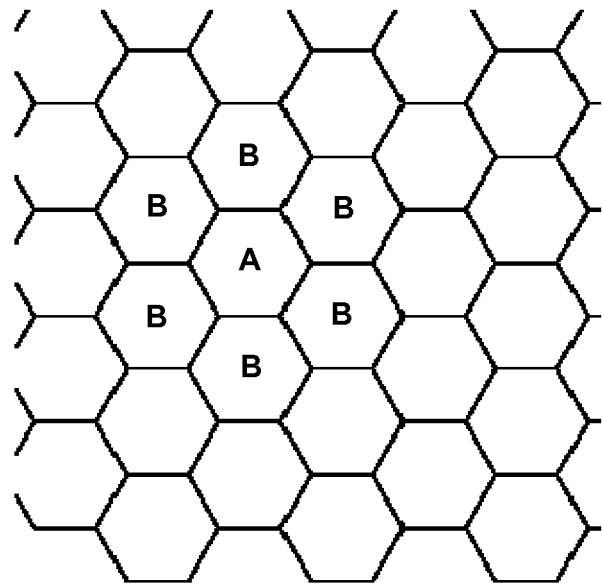
FIG. 2 shows registration areas in a mobile wireless network
Figure 2:
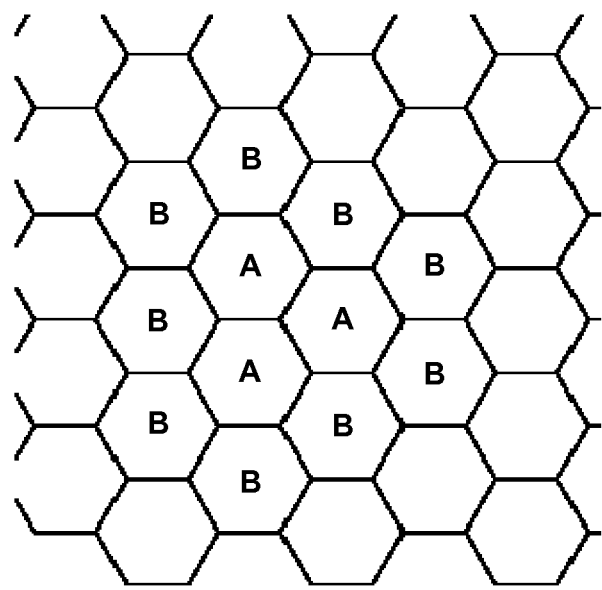

FIG. 2 shows a number of registration areas represented by hexagons, e.g. RAs A, B. A mobile device being in the RA marked with A in FIG. 2(a) receives a set of registration areas marked with B as a list of RAs where it does not need to perform a new registration update immediately. The list is associated with the RA A, where the mobile device currently is and comprises the neighbor RAs B and potentially also RA A. The list of RAs can be different depending on which RA the mobile device currently is. FIG. 2(b) shows an example of having larger RA lists. This allows that the same list can be used in a plurality of RAs A. In an embodiment, a registration update is not necessary if the mobile device moves between different RAs A.

If the mobile device moves to a new RA which is in the last received list, the registration update is scheduled by the mobile device with a random time delay. Since the new RA is in the last received list the mobile device is reachable if a paging is performed in the RAs in the list and a registration update is not urgent.

Therefore a new update can be scheduled with a random time delay. An upper bound for the random time delay could be a global fixed value or a fixed value for the specific RA, e.g. in the range of minutes. The upper bound for the time delay could also be the minimum of a fixed value and a value dependent on the time between the last registration update and the change to a new RA, multiplied by a factor between 0 and 1. In the latter case, for fast moving mobile devices, the time delay would be shorter while for slow moving mobile devices it would be longer. Introducing a time delay in the execution of a registration update has the advantage that the signaling load is spread randomly over time, avoiding possible disruptions in the services available to mobile devices due to peaks in the signaling load. Also during the random time delay the mobile devices remain reachable.

The processes described above require implementation, both in a mobile device and in the nodes of a communications network which handle the functions that support the mobility of mobile devices, e.g. a Serving GPRS Support Node or an MSC in a 3GPP system or a Mobility Management Entity in a System Architecture Evolution system. In particular the paging of a mobile device has to be performed according to the lists transmitted to the mobile devices. For example the paging can be performed in all cells in the list simultaneously or initially in the registered RA of the mobile device and then in the further RAs in the list.

Figure 3:
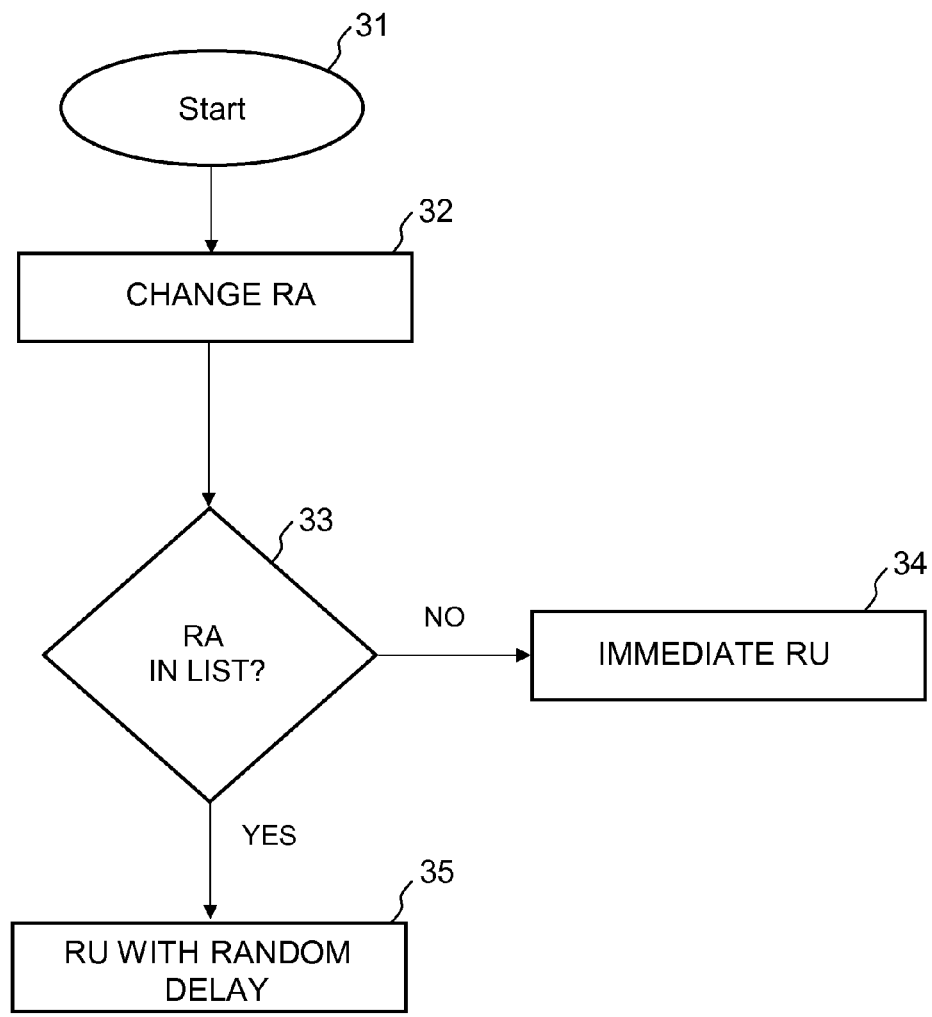
FIG. 3 shows a flow chart of an embodiment of the proposed method

A flow diagram of the proposed method of the invention is shown in FIG. 3. At the start 31 of the method a mobile device is registered in an initial registration area. Here the mobile device executed a registration update and received a list of associated further RAs. Upon change 32 of the location of a mobile device to a new RA from the previous RA, a check on the new RA is performed in step 33. In this step, it is checked whether the new RA is in the list received from the mobile device during the last registration update. If the new RA is not in the list, a registration update (RU) is immediately performed in step 34. If the new RA is in the list, the RU is scheduled by the mobile device with a random time delay in step 35.

The invention can also be embodied in a mobile device UE, also designated as user equipment. The mobile device can be for example a mobile telephone, a personal digital assistant or a computer with an access module for a mobile network. The mobile device can be adapted to perform any embodiments of the method as described above.

Figure 4:
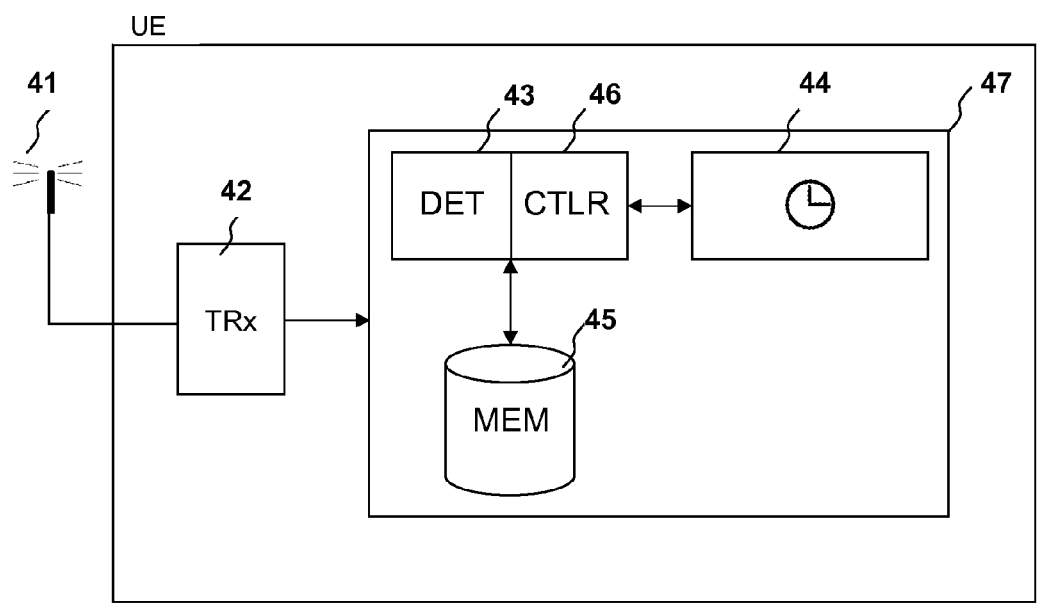
FIG. 4 shows a device which is adapted to perform the proposed method

An embodiment of a mobile device UE is shown in FIG. 4 and comprises a control device 47. A transceiver unit 42 is adapted to receive lists of RAs after the registration updates and also indications of new RAs, due to change of the location of the mobile device UE, through an antenna 41. The lists are forwarded to the control device 47 and stored in a memory unit 45. The control device comprises also a detector 43 adapted to detect changes of the location of the mobile device UE based on indications of new RAs received through the transceiver unit 42. A controller 46 is adapted to perform a check of a new RA against the list of RAs stored in the memory unit. Controller 46 is furthermore adapted to schedule, according to the result of the check, a registration update with or without a random delay controlled by the timer 44. If the new RA is not in the list, the registration update is executed immediately. If the new RA is in the list, the registration update is scheduled to be executed with a random time delay. Detector 43 and controller 46 can be embodied in hardware or in software executed in a processing system of the mobile device.

The above embodiments admirably achieve the objects of the invention. However, it will be appreciated that departures can be made by those skilled in the art without departing from the scope of the invention which is limited only by the claims.

The invention claimed is:

1. A method for a registration update of a mobile device (UE) in a communication network, wherein the location of the mobile device (UE) is registered in a first registration area (A) and associated with a list of further registration areas (B), and wherein a registration area update is triggered when the mobile device (UE) is detecting a change (32) of location to a second registration area,
    wherein the registration area update is initiated with a random time delay after the mobile device (UE) detects the change to the second registration area if the second registration area is in the list of further registration areas (B), and
    wherein the list of further registration areas (B) comprises at least one third registration area, in addition to the further registration areas (B), and wherein the mobile device (UE) does not perform a registration area update if the mobile device (UE) detects the change of location to the third registration area.

2. The method according to claim 1, wherein the list of further registration areas (B) is updated in the registration area update.

3. The method according to claim 1, wherein the first registration area (A) is in the list of further registration areas (B).

4. The method according to claim 1, wherein a paging of the mobile device (UE) is executed in the further registration areas (B) from the list.

5. The method according to claim 1, wherein the list of further registration areas (B) is centered at the first registration area (A).

6. The method according to claim 1, wherein the registration area update is initiated immediately when the mobile device (UE) detects the change to a second registration area and the second registration area is not in the list of further registration areas (B).

7. The method according to claim 1, wherein the random time delay is within a range which has a maximum value dependent on the time between prior executions of the registration area updates.

8. The method according to claim 1, wherein the random time delay is within a range which has a minimum value larger than zero.

9. A user equipment for a mobile communication network, the user equipment comprising
    a receiver unit for receiving a list of registration areas and indications of registration areas,
    a control device for triggering a registration area update,
    a memory for storing the list of registration areas, a detector for detecting a change of location based on an indication of a second registration area, wherein the control device is adapted to initiate the execution of the registration area update with a random time delay after the change of location is detected if the second registration area is in the stored list of registration areas, and wherein the stored list of registration areas comprises at least one third registration area, and wherein the control device does not perform a registration area update if the detector detects the change of location to the third registration area.

* * * * *